(12) United States Patent
Mu

(10) Patent No.: US 12,445,942 B2
(45) Date of Patent: Oct. 14, 2025

(54) RANDOM ACCESS METHOD AND APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 784 days.

(21) Appl. No.: 17/636,007

(22) PCT Filed: Aug. 16, 2019

(86) PCT No.: PCT/CN2019/101181
§ 371 (c)(1),
(2) Date: Feb. 16, 2022

(87) PCT Pub. No.: WO2021/031008
PCT Pub. Date: Feb. 25, 2021

(65) Prior Publication Data
US 2022/0279588 A1   Sep. 1, 2022

(51) Int. Cl.
*H04W 48/16* (2009.01)
*H04W 74/00* (2009.01)
*H04W 74/0833* (2024.01)

(52) U.S. Cl.
CPC ......... *H04W 48/16* (2013.01); *H04W 74/002* (2013.01); *H04W 74/004* (2013.01); *H04W 74/0833* (2013.01)

(58) Field of Classification Search
CPC ........... H04W 74/0833; H04W 74/002; H04W 48/16; H04W 74/004; H04W 72/569;
(Continued)

(56) References Cited

U.S. PATENT DOCUMENTS

2018/0234839 A1* 8/2018 Tenny ............... H04W 36/0033
2018/0279348 A1* 9/2018 Huang et al. ..... H04W 72/1284
(Continued)

FOREIGN PATENT DOCUMENTS

CN   107277939 A   10/2017
CN   109863816 A   6/2019
(Continued)

OTHER PUBLICATIONS

International Search Report of PCT/CN2019/101181 dated May 19, 2020 with English translation, (4p).
(Continued)

*Primary Examiner* — Un C Cho
(74) *Attorney, Agent, or Firm* — Arch & Lake LLP; Hao Tan; Shen Wang

(57) ABSTRACT

A random access method is provided. The method is applied to a terminal in a grant-free scheduling state. The terminal in the grant-free scheduling state is in a non-connected state, and data is transmitted on a resource pre-configured by a network device for the terminal at a designated transmission opportunity when the data is required to be transmitted. The method includes: transmitting a message 3 on a random access resource; and reporting a user identifier in the message 3, where the user identifier includes an international mobile subscriber identity (IMSI) or a pre-configured cell-radio network temporary identifier (C-RNTI).

6 Claims, 6 Drawing Sheets

(58) Field of Classification Search
CPC . H04W 72/21; H04W 72/1268; H04W 72/12; H04W 72/1263; H04B 7/2612
See application file for complete search history.

(56) References Cited

U.S. PATENT DOCUMENTS

| | | | |
|---|---|---|---|
| 2018/0295651 A1* | 10/2018 | Cao et al. | H04W 74/0833 |
| 2018/0368117 A1* | 12/2018 | Ying et al. | H04W 72/042 |
| 2019/0208411 A1 | 7/2019 | Shrestha et al. | |
| 2020/0037345 A1* | 1/2020 | Ryoo | H04W 74/0833 |
| 2021/0112590 A1* | 4/2021 | Kim et al. | H04W 74/008 |
| 2021/0227575 A1* | 7/2021 | Ou et al. | H04W 72/14 |
| 2021/0385856 A1* | 12/2021 | Irukulapati et al. | H04W 74/002 |
| 2022/0225425 A1* | 7/2022 | Xing | H04L 5/0048 |
| 2022/0361023 A1* | 11/2022 | Luo | H04L 1/08 |

FOREIGN PATENT DOCUMENTS

| | | | | |
|---|---|---|---|---|
| EP | 3506708 B1 * | 7/2019 | | H04W 72/1268 |
| EP | 3554123 A1 * | 12/2019 | | H04W 28/0215 |

OTHER PUBLICATIONS

Huawei et al., "Data Transmission in Inactive State, Option A vs. Option B", Discussion and Decision, 3GPP TSG-RAN WG2 #97 R2-1701127, Athens, Greece, Feb. 13-17, 2017, (5p).

Spreadtrum Communications, "UL Data Transmission in Inactive", Discussion and Decision, 3GPP TSG-RAN WG2 Meeting #101bis R2-1804471, Sanya, China, Apr. 16-20, 2018, (2p).

* cited by examiner

RANDOM ACCESS METHOD AND APPARATUS, AND STORAGE MEDIUM

CROSS-REFERENCE TO RELATED APPLICATION

The present application is the U.S. national phase application of International Application No. PCT/CN2019/101181, filed on Aug. 16, 2019, the disclosure of which is incorporated herein by reference in its entirety for all purposes.

TECHNICAL FIELD

The present disclosure relates to the field of communication technologies, and in particular, to a random access method and apparatus, and a storage medium.

BACKGROUND

In recent years, Internet of Thing (IoT) technologies such as narrow band Internet of Thing (NB-IoT) and machine type communication (MTC) have developed vigorously and have been applied in various fields, bringing great benefits and conveniences to human's life and work.

In the related art, grant-free scheduling is introduced in IoT communication scenarios. In the grant-free scheduling, on the one hand, a network device preconfigures a scheduling resource used for transmission by a terminal, such as resource allocation, a modulation and demodulation mode, and the like. The terminal does not need to perform random access or to receive uplink scheduling grant, and can automatically perform uplink transmission on the preconfigured scheduling resource, thereby reducing signaling overhead and avoiding power waste. On the other hand, in order to facilitate the terminal to scramble data when sending the data, and also to facilitate the terminal to receive a Hybrid Automatic Repeat reQuest (HARD) feedback based on a Physical Downlink Control Channel (PDCCH) after sending the data, the network device may also configure a Cell Radio Network Temporary Identity (C-RNTI) for the terminal in advance.

When link quality changes, there is a possibility that the terminal cannot successfully transmit the data on the preconfigured scheduling resource. In this case, the terminal needs to perform the random access to re-access the network. In a random access procedure, the terminal needs to report a user identity.

SUMMARY

The present disclosure provides a random access method and apparatus, and a storage medium.

According to a first aspect of the present disclosure, there is provided a random access method, applied to a terminal. The terminal is in a grant-free scheduling state, the terminal in the grant-free scheduling state is in a non-connected state, and when the terminal has data to be transmitted, the data is transmitted by the terminal on a resource preconfigured by a network device for the terminal at a designated transmission occasion. The method includes: transmitting a message 3 on a random access resource; and reporting a user identity in the message 3, wherein the user identity includes an international mobile subscriber identity (IMSI) or a preconfigured cell radio network temporary identity (C-RNTI).

According to a second aspect of the present disclosure, there is provided a random access method, which is applied to a network device. The method includes: receiving a message 3 on a random access resource, where the message 3 includes a user identity; and sending a message 4.

The user identity is an IMSI, the message 4 is included in a physical downlink shared channel (PDSCH) scheduled by a first physical downlink control channel (PDCCH), and the first PDCCH is scrambled by a temporarily allocated C-RNTI.

The user identity is a preconfigured C-RNTI, and the message 4 is included in a PDSCH scheduled by a second PDCCH.

A target cell to be accessed is an original serving cell, and the second PDCCH is scrambled by the preconfigured C-RNTI.

The target cell to be accessed is not the original serving cell, and the second PDCCH is scrambled by a temporarily allocated C-RNTI.

According to a third aspect of the present disclosure, there is provided a random access apparatus, applied to a terminal. The terminal is in a grant-free scheduling state, the terminal in the grant-free scheduling state is in a non-connected state, and when the terminal has data to be transmitted, the data is transmitted by the terminal on a resource preconfigured by a network device for the terminal at a designated transmission occasion. Further, The apparatus includes a processor and a memory for storing instructions executable by the processor, where the processor is configured to execute the random access method according to the first aspect.

According to a fourth aspect of the present disclosure, there is provided a non-transitory computer-readable storage medium, wherein instructions in the storage medium, when being executed by a processor of a mobile terminal, enables the mobile terminal to execute the random access method according to the first aspect.

According to a fifth aspect of the present disclosure, there is provided a random access apparatus including a processor and a memory for storing instructions executable by the processor, wherein the processor is configured to execute the random access method according to the second aspect.

According to a sixth aspect of the present disclosure, there is provided a non-transitory computer-readable storage medium, wherein instructions in the storage medium, when being executed by a processor of a network device, enables the network device to execute the random access method according to the second aspect.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in and constitute a part of the disclosure, illustrate embodiments consistent with the present disclosure and, together with the description, serve to explain the principles of the present disclosure.

DETAILED DESCRIPTION

Embodiments will be described in detail here, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the present disclosure. Instead, they are merely examples of apparatuses and methods consistent with some of aspects of the present disclosure as recited in the appended claims.

Figure 1:
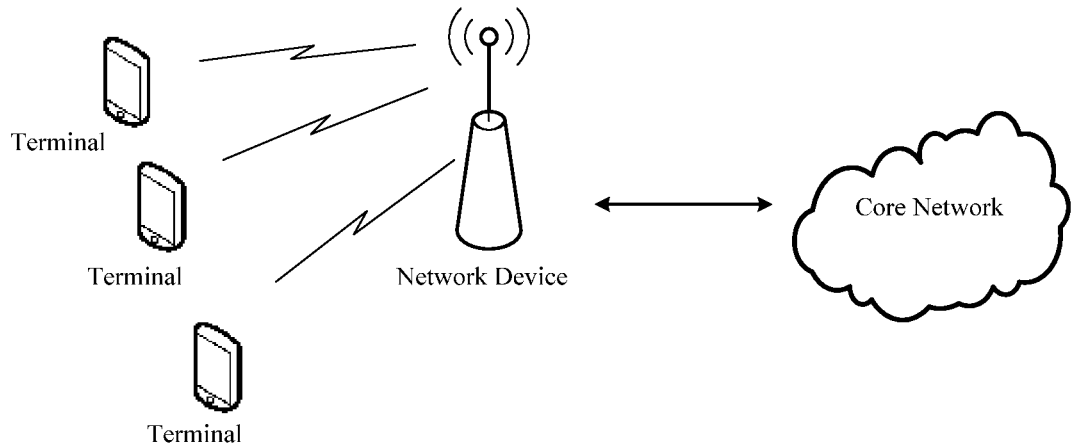
FIG. 1 is a schematic diagram showing a wireless communication system according to some embodiments.

The method provided by the present disclosure can be applied to a wireless communication system shown in FIG. 1. As shown in FIG. 1, a terminal accesses a network through a network device such as a base station, and the network device and a core network complete backhaul and forward transmission of data, so as to perform various communication services.

It can be understood that the wireless communication system is a network that provides wireless communication functions. The wireless communication system can employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Depending on capacities, speeds, delays and other factors of different networks, the networks can be divided into 2G (generation) networks, 3G networks, 4G networks or future evolution networks, such as 5G networks which can also be called new radio (NR) networks. For convenience of description, the wireless communication network may sometimes be referred to simply as a network or a system in the present disclosure. The network in the present disclosure may include a radio access network (RAN) and a core network (CN). The network includes the network device, and the network device may be, for example, a wireless access network node, a core network device, an Internet of Things platform, an Internet of Things application server, and the like. The radio access network node may also be referred to as the base station. The network can provide network services for the terminal through the network device, and different operators can provide different network services for the terminal. It can also be understood that different operators correspond to different operator networks.

The terminal, also known as a user equipment (UE), a mobile station (MS), a mobile terminal (MT), etc., is a device that provides voice and/or data connectivity to a user. For example, the terminal may be a handheld device with a wireless connection function, a vehicle-mounted device, or the like. At present, some examples of the terminal are: a smart mobile phone, a pocket personal computer (PPC), a palmtop, a personal digital assistant (PDA), a notebook computer, a tablet computer, a wearable device, a vehicle-mounted device, or the like. In the present disclosure, the terminal may be a device with an embedded NB-IoT chip.

Figure 2:
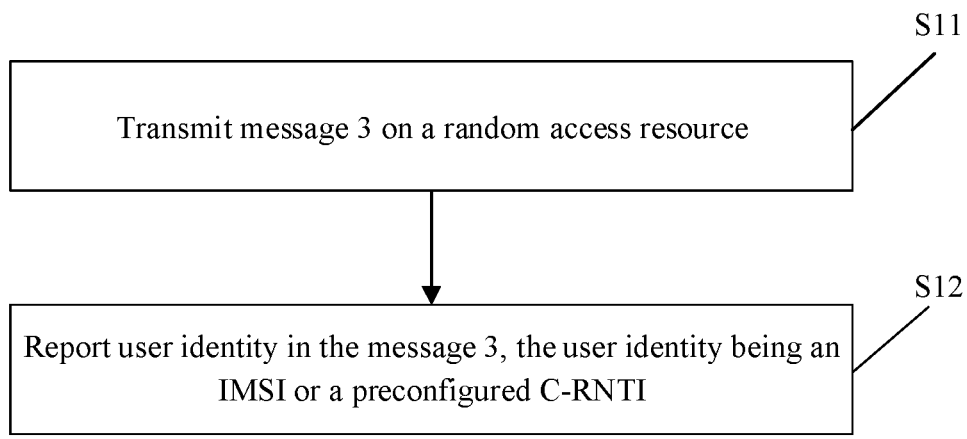
FIG. 2 is a flowchart showing a random access method according to an embodiment.

In the related art, when the terminal performs data transmission with the network device, if data volume of each data transmission is relatively small, in order to reduce signaling overhead in a random access procedure and an uplink scheduling grant process, grant-free uplink scheduling is introduced. FIG. 2 is a schematic diagram of data transmission in a grant-free uplink scheduling process. In the grant-free uplink scheduling, the network device preconfigures resources used for transmission by the terminal, such as resource allocation, a modulation and demodulation mode, and the like, and when the terminal needs to transmit data, it does not need to perform the random access or receive the uplink scheduling grant, and can perform uplink transmission on the preconfigured resource, thereby reducing signaling overhead and avoiding power waste.

In the grant-free uplink scheduling, the terminal is in a non-connected state (also known as radio resource control (RRC) idle state), and when the data needs to be transmitted, the terminal transmits the data on a resource preconfigured by the network device for the terminal at a designated transmission occasion. When link quality changes, there is a possibility that the terminal cannot successfully transmit the data on the preconfigured scheduling resource. In this case, the terminal needs to perform the random access to re-access the network. In a traditional random access procedure, the terminal needs to report a user identity in a message 3 (Msg.3). However, in the grant-free uplink scheduling, in order to facilitate the terminal to scramble the data when sending the data, and also to facilitate the terminal to receive a HARQ feedback of a PDCCH after sending the data, the network device configures a C-RNTI for the terminal in advance, and the C-RNTI can be used as the user identity. In addition, the IMSI of the terminal or a random number generated by the terminal can also be used as the user identity. Therefore, when the terminal using the grant-free uplink scheduling needs to perform the random access to re-access the network due to the change in link quality, it is currently not considered which user identity to be reported in the random access procedure.

In view of this, the present disclosure provides a random access method in which a user identity to be reported is explicitly specified for a terminal using grant-free uplink scheduling, and the user identity is a preconfigured C-RNTI or an IMSI, which avoids the situation where it cannot know which user identity is to be reported, and improves communication efficiency.

It can be understood that the random access method provided by the present disclosure is applicable to a terminal in a grant-free scheduling state, and the terminal in the grant-free scheduling state can also be understood as a terminal using the grant-free uplink scheduling. The above two description manners are often used interchangeably in the present disclosure, and those skilled in the art should understand their meanings. The terminal being in the grant-free scheduling state can be understood that the terminal is in a non-connected state, and when there is data to be transmitted, the terminal transmits the data on a resource preconfigured by a network device for the terminal at a designated transmission occasion.

FIG. 2 is a flowchart showing a random access method according to an embodiment. As shown in FIG. 2, the random access method is used in the terminal and includes the following steps.

In step S11, a message 3 is transmitted on a random access resource.

In step S12, a user identity is reported in the message 3, where the user identity is an IMSI or a preconfigured C-RNTI.

After the terminal reports the user identity in the message 3, the network device receives the message 3, and controls the sending of a subsequent message 4 (Msg.4) based on the user identity in the message 3.

Figure 3:
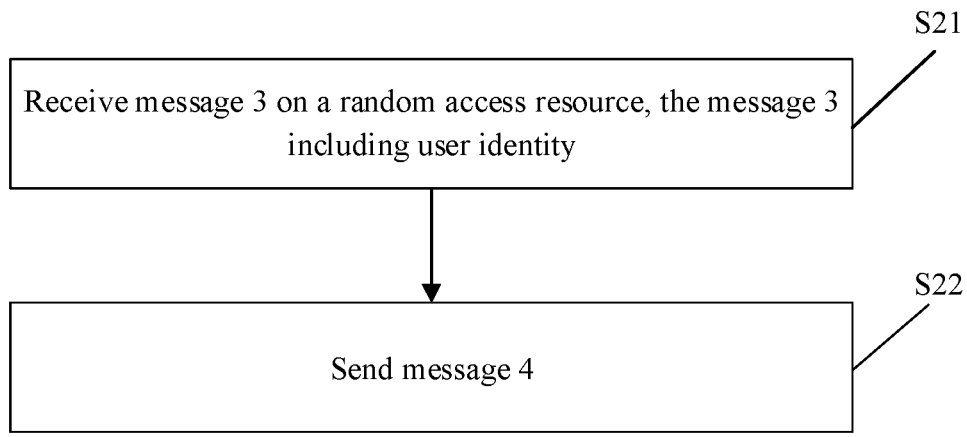
FIG. 3 is a flowchart showing a random access method according to an embodiment.

FIG. 3 is a flowchart showing a random access method according to an embodiment. As shown in FIG. 3, the random access method is used in the network device and includes the following steps.

In step S21, a message 3 is received on a random access resource, where the message 3 includes a user identity.

In the present disclosure, the user identity included in the message 3 is an IMSI or a preconfigured C-RNTI.

In step S22, a message 4 is sent. The message 4 is contained in a physical downlink shared channel (PDSCH) scheduled by a PDCCH. In the present disclosure, depending on different user identities reported in message 3, the PDCCH is scrambled by using different user identities. For example, when the user identity is the IMSI, the PDCCH is scrambled by a C-RNTI temporarily allocated by the network device subsequently. The user identity is the preconfigured C-RNTI, and the PDCCH is scrambled by the preconfigured C-RNTI or the C-RNTI temporarily allocated by the network device subsequently.

An implementation process of reporting the IMSI or the preconfigured C-RNTI in the message 3 will be described in combination with practical applications of the present disclosure hereinafter.

In an implementation, the user identity reported by the terminal in the random access procedure is explicitly the IMSI.

When the user identity reported by the terminal in the random access procedure is explicitly the IMSI, a subsequent Msg.3 retransmission scheduling and Msg.4 transmission are performed based on the TC-RNTI subsequently allocated by the network device. For example, the network device sends the message 4, the terminal obtains the message 4, and the message 4 is contained in the PDSCH scheduled by the PDCCH scrambled by the temporarily allocated C-RNTI.

Moreover, when the cell which the terminal accesses changes after the terminal initiates the random access, the terminal reports previous cell access information and the grant-free scheduling state in which the terminal is. When a serving cell accessed by the terminal changes, the newly connected serving cell can notify an original serving cell to release a resource preconfigured for the terminal.

Figure 4:
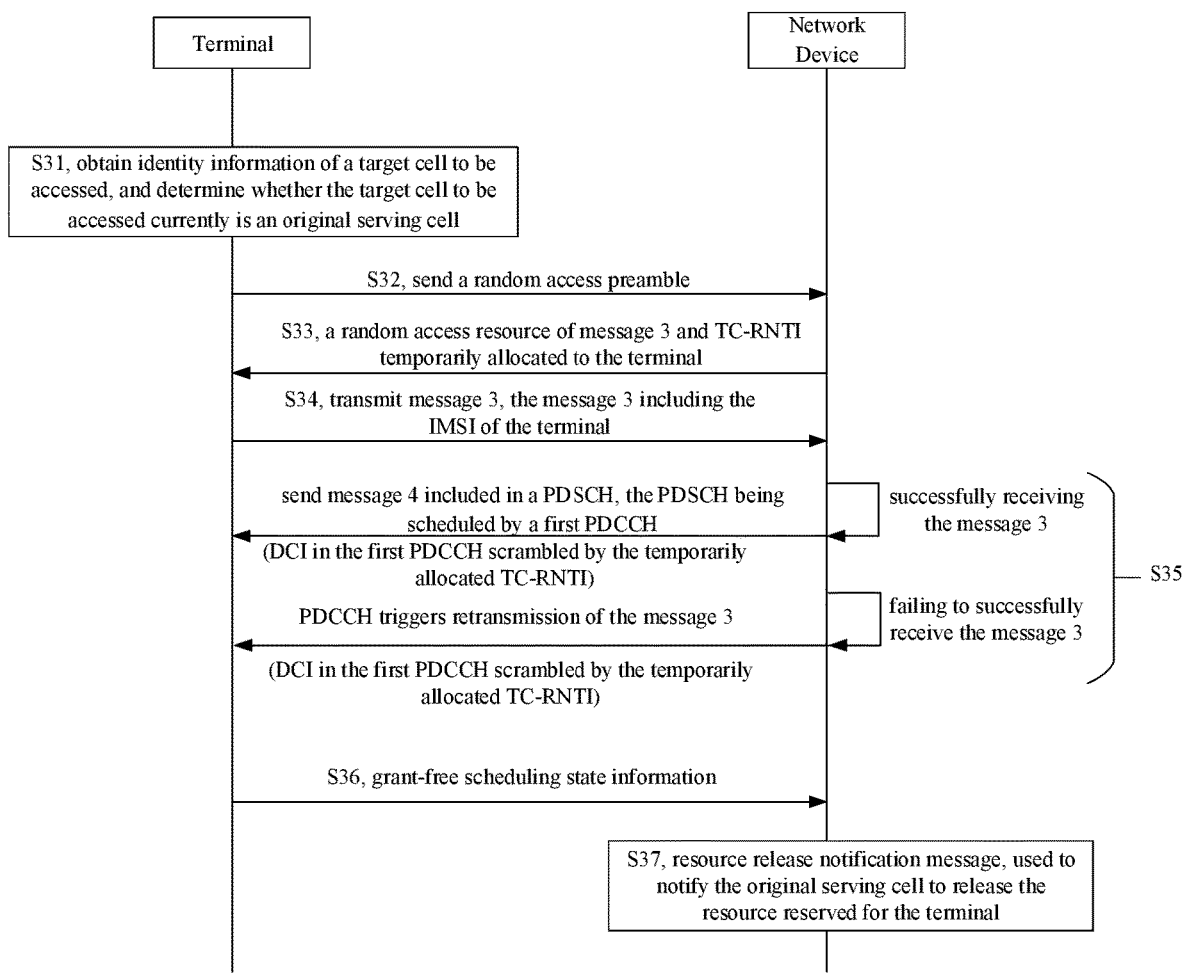
FIG. 4 is a flowchart showing a random access method according to an embodiment.

FIG. 4 is a flowchart showing a random access method according to an embodiment. As shown in FIG. 4, the method includes the following steps.

In step 31, the terminal reads a synchronization signal and a broadcast signal of a target cell, obtains identity information of the target cell to be accessed in the synchronization signal, and determines whether the target cell to be accessed currently is an original serving cell.

In step S32, the terminal selects a random access resource to send a random access preamble to the network device.

In step S33, the network device sends a random access response to the terminal, where the random access response includes a random access resource for a subsequent message 3 and a C-RNTI temporarily allocated to the terminal. The C-RNTI temporarily allocated to the terminal may be referred to as TC-RNTI.

In step S34, the terminal transmits the message 3 on the random access resource allocated by the network device, where the message 3 includes the IMSI of the terminal.

In step S35, the network device schedules the retransmission of the message 3, and sends the message 4 to the terminal.

In the present disclosure, if the network device successfully receives the message 3, the network device sends the message 4 to the terminal, the message 4 is contained in the PDSCH, and the PDSCH is scheduled by the PDCCH.

For the convenience of description, when the user identity included in the message 3 is the IMSI, the PDCCH scheduling the PDSCH is referred to as a first PDCCH. In the present disclosure, when the user identity included in the message 3 is the IMSI, DCI in the first PDCCH is scrambled by the TC-RNTI temporarily allocated by the network device in the above step S33.

If the network device fails to receive the message 3 successfully, it sends the PDCCH to trigger the retransmission of the message 3, and DCI of the PDCCH triggering the retransmission of message 3 is scrambled by the TC-RNTI temporarily allocated by the network device in the above step S33.

Further, in the present disclosure, after the terminal initiates the random access to re-access the network, when the accessed serving cell changes, the terminal can report grant-free scheduling state information, and the grant-free scheduling state information indicates that the terminal is in the grant-free scheduling state, so that the network device releases a resource preconfigured for the terminal in the original serving cell.

In the present disclosure, the terminal may report identity information of the original serving cell, or may not report the identity information of the original serving cell. If the terminal does not report the identity information of the original serving cell, the network device may determine whether there is the preconfigured resource, and release the resource preconfigured by the original serving cell for the terminal. If the terminal reports the cell identity of the original serving cell, the network device can determine the original serving cell according to the cell identity, and send a resource release notification message to the original serving cell identified by the cell identity to notify the original serving cell to release the resource reserved for the terminal.

It can be understood that the preconfigured resource and the reserved resource in the present disclosure are often used interchangeably, and those skilled in the art should understand their meanings.

In step S36, the terminal reports the grant-free scheduling state information. The grant-free scheduling state information indicates that the terminal is in the grant-free scheduling state in the original serving cell. The terminal may also report the cell identity of the original serving cell. The network device obtains the grant-free scheduling state information reported by the terminal, or obtains the cell identity of the original serving cell and the grant-free scheduling state information reported by the terminal.

Whether the terminal reports the cell identity of the original serving cell or not may be determined according to whether the serving cell randomly accessed by the terminal changes or not. When the randomly accessed serving cell changes, the terminal also needs to report the cell identity of the original serving cell.

In step S37, the network device sends the resource release notification message to the original serving cell, where the resource release notification message is used to notify the original serving cell to release the resource reserved for the terminal.

In another implementation, the user identity reported by the terminal in the random access procedure is explicitly the preconfigured C-RNTI.

When the user identity reported by the terminal in the random access procedure is explicitly the preconfigured C-RNTI, the random access method involved in the present disclosure further includes: the terminal determines whether the target cell to be accessed is the original serving cell; and if the target cell to be accessed is not the original serving cell, the terminal reports the cell identity of the original serving cell. It can be understood that when the randomly accessed serving cell changes, the terminal also needs to report information of the previous serving cell and the grant-free scheduling state information indicating that the terminal is in the grant-free scheduling state in the previous serving cell. When the randomly accessed current serving cell receives the cell identity of the original serving cell and the grant-free scheduling state information sent by the terminal, the randomly accessed current serving cell can obtain relevant information of the terminal such as the IMSI from the original serving cell. And, the randomly accessed current serving cell (a network device) may notify the original serving cell to release the resource preconfigured for the terminal. For the scheduling of the message 4, if the target cell to be accessed is the original serving cell, the PDCCH is scrambled by the preconfigured C-RNTI; and if the target cell to be accessed is not the original serving cell, the PDCCH is scrambled by the temporarily allocated C-RNTI.

Figure 5:
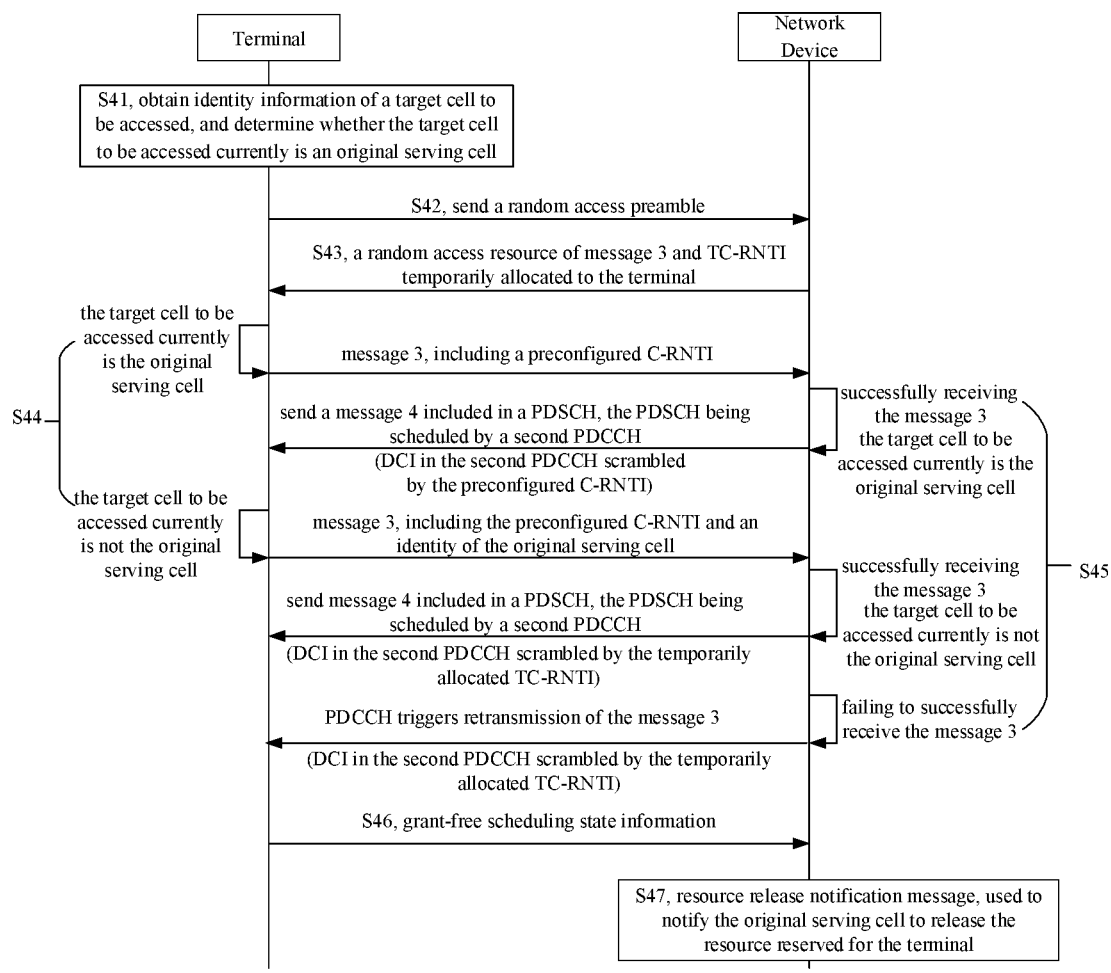
FIG. 5 is a flowchart showing a random access method according to an embodiment.

FIG. 5 is a flowchart showing a random access method according to an embodiment. As shown in FIG. 5, the method includes the following steps.

In step 41, the terminal reads a synchronization signal and a broadcast signal of a target cell, obtains identity information of the target cell to be accessed in the synchronization signal, and determines whether the target cell to be accessed currently is an original serving cell.

In step S42, the terminal selects a random access resource to send a random access preamble to the network device.

In step S43, the network device sends a random access response to the terminal, where the random access response includes a random access resource for a subsequent message 3 and a C-RNTI temporarily allocated to the terminal. The C-RNTI temporarily allocated to the terminal may be referred to as TC-RNTI.

In step S44, the terminal transmits the message 3 on the random access resource allocated by the network device, where the message 3 includes a preconfigured C-RNTI.

Depending on a result of the determination in the step S41, if the target cell to be accessed currently is the original serving cell, the terminal reports the C-RNTI, and if the target cell to be accessed currently is not the original serving cell, in addition to reporting the C-RNTI, the terminal also needs to report identity of the original serving cell and grant-free scheduling state information indicating that the terminal is in the grant-free scheduling state.

In step S45, the network device schedules retransmission of the message 3, and sends a message 4 to the terminal.

In the present disclosure, if the network device successfully receives the message 3, the network device may obtain the relevant information of the terminal from the original serving cell, such as the IMSI and so on, and then send the message 4 to the terminal. The message 4 is included in the PDSCH, and the PDSCH is scheduled by the PDCCH.

For the convenience of description, when the user identity included in the message 3 is the preconfigured C-RNTI, the PDCCH scheduling the PDSCH is referred to as a second PDCCH. In the present disclosure, when the user identity included in the message 3 is the preconfigured C-RNTI, it can be determined whether the randomly accessed serving cell changes, so as to determine the information for scrambling the DCI of the second PDCCH. If the randomly accessed serving cell does not change, the DCI of the second PDCCH is scrambled by using the previous preconfigured C-RNTI. If the randomly accessed serving cell changes, the DCI in the second PDCCH is scrambled by the TC-RNTI temporarily allocated by the network device.

If the network device fails to receive the message 3 successfully, it sends the PDCCH to trigger the retransmission of the message 3, where DCI of the PDCCH triggering the retransmission of message 3 is scrambled by the TC-RNTI temporarily allocated by the network device as described above.

In step S46, the terminal reports the grant-free scheduling state information. The grant-free scheduling state information indicates that the terminal is in the grant-free scheduling state in the original serving cell. The terminal may also report the cell identity of the original serving cell. The network device obtains the grant-free scheduling state information reported by the terminal, or obtains the cell identity of the original serving cell and the grant-free scheduling state information reported by the terminal.

Whether the terminal reports the cell identity of the original serving cell or not may be determined depending on whether the serving cell randomly accessed by the terminal changes. When the randomly accessed serving cell changes, the terminal needs to also report the cell identity of the original serving cell.

In step S47, the network device sends a resource release notification message to the original serving cell, where the resource release notification message is used to notify the original serving cell to release the resource reserved for the terminal.

In another embodiment, depending on whether the target cell to be accessed changes or not, it is determined whether the user identity reported is the C-RNTI or the IMSI. If the target cell to be accessed is the original serving cell, the user identity includes the preconfigured C-RNTI; and if the target cell to be accessed is not the original serving cell, the user identity includes the IMSI.

When the user identity reported by the terminal in the random access procedure is explicitly the IMSI, the subsequent Msg.3 retransmission scheduling and the Msg.4 transmission are performed based on the TC-RNTI subsequently allocated by the network device. For example, the network device sends the message 4, the terminal obtains the message 4, the message 4 is included in the PDSCH scheduled through the PDCCH, and the PDCCH is scrambled by the temporarily allocated C-RNTI. When the user identity reported by the terminal in the random access procedure is explicitly the preconfigured C-RNTI, for the subsequent Msg.3 retransmission scheduling and the Msg.4 scheduling, the scrambling is based on the preconfigured C-RNTI or the temporarily allocated C-RNTI. If the target cell to be accessed is the original serving cell, the second PDCCH is scrambled by the preconfigured C-RNTI; and if the target cell to be accessed is not the original serving cell, the second PDCCH is scrambled by the temporarily allocated C-RNTI.

Figure 6:
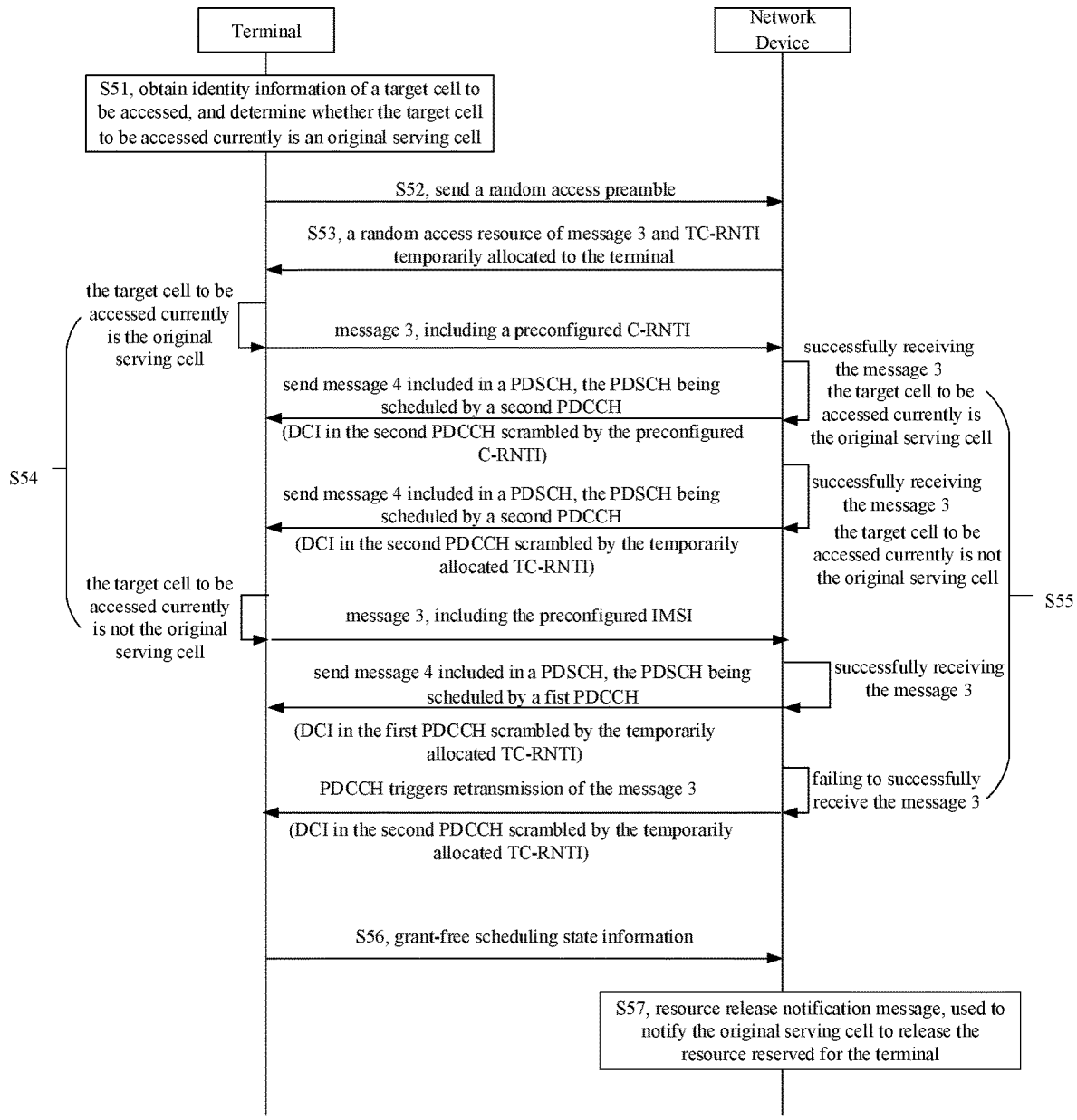
FIG. 6 is a flowchart showing a random access method according to an embodiment.

FIG. 6 is a flowchart showing a random access method according to an embodiment. As shown in FIG. 6, the method includes the following steps.

In step S1, the terminal reads a synchronization signal and a broadcast signal of a target cell, obtains identity information of the target cell to be accessed in the synchronization signal, and determines whether the target cell to be accessed currently is an original serving cell.

In step S52, the terminal selects a random access resource to send a random access preamble to the network device.

In step S53, the network device sends a random access response to the terminal, where the random access response includes a random access resource for a subsequent message 3 and a C-RNTI temporarily allocated to the terminal. The C-RNTI temporarily allocated to the terminal may be referred to as TC-RNTI.

In step S54, the terminal transmits the message 3 on the random access resource allocated by the network device. Based on a result of the determination in the step S51, it is determined whether the user identity included in the message 3 is the IMSI or the preconfigured C-RNTI. If the target cell to be accessed is the original serving cell, the user identity includes the preconfigured C-RNTI. If the target cell to be accessed is not the original serving cell, the user identity includes the IMSI.

In step S55, the network device schedules retransmission of the message 3, and sends a message 4 to the terminal.

In the present disclosure, if the network device successfully receives the message 3, the network device can obtain the relevant information of the terminal from the original serving cell, such as the IMSI and so on, and then send the message 4 to the terminal. The message 4 is included in the PDSCH, and the PDSCH is scheduled by the PDCCH.

For the convenience of description, when the user identity included in the message 3 is the preconfigured C-RNTI, the PDCCH scheduling the PDSCH is referred to as a second PDCCH. In the present disclosure, when the user identity included in the message 3 is the preconfigured C-RNTI, it can be determined whether the randomly accessed serving cell changes, so as to determine the information for scrambling the DCI of the second PDCCH. If the randomly accessed serving cell does not change, the DCI of the second PDCCH is scrambled by using the previous preconfigured C-RNTI. If the randomly accessed serving cell changes, the DCI in the second PDCCH is scrambled by the TC-RNTI temporarily allocated by the network device.

If the network device fails to receive the message 3 successfully, it sends the PDCCH to trigger the retransmission of the message 3, and DCI of the PDCCH triggering the retransmission of message 3 is scrambled by the TC-RNTI temporarily allocated by the network device as described above.

In step S56, the terminal reports the grant-free scheduling state information. The grant-free scheduling state information indicates that the terminal is in the grant-free scheduling state in the original serving cell. The terminal may also report the cell identity of the original serving cell. The network device obtains the grant-free scheduling state information reported by the terminal, or obtains the cell identity of the original serving cell and the grant-free scheduling state information reported by the terminal.

Whether the terminal reports the cell identity of the original serving cell or not may be determined depending on whether the serving cell randomly accessed by the terminal changes or not. When the randomly accessed serving cell changes, the terminal needs to also report the cell identity of the original serving cell.

In step S57, the network device sends the resource release notification message to the original serving cell, where the resource release notification message is used to notify the original serving cell to release the resource reserved for the terminal.

In the random access methods involved in the above embodiments of the present disclosure, it is explicitly specified that the user identity that needs to be reported by the user in the grant-free scheduling when performing the random access is the IMSI or the preconfigured C-RNTI, which avoids the situation where it cannot know which user identity is to be reported, and improves the communication efficiency. Further, when the randomly accessed target cell is inconsistent with the original cell, the terminal can report the information of the original serving cell, such as the cell identity of the original serving cell, and the grant-free scheduling state information indicating that the user is in the grant-free scheduling state, so that the network device sends the resource release notification message, and notifies the original serving cell to release the resource reserved for the terminal through the resource release notification message.

Based on the same concept, the embodiments of the present disclosure also provide a random access apparatus.

It can be understood that, in order to implement the above-mentioned functions, the random access apparatus provided by the embodiments of the present disclosure includes corresponding hardware structures and/or software modules for executing the functions. In combination with units and algorithm steps of various examples disclosed in the embodiments of the present disclosure, the embodiments of the present disclosure may be implemented in a form of hardware or a combination of the hardware and computer software. Whether a certain function is implemented in the form of hardware or in that the form of the computer software driving the hardware depends on particular applications and design constraints of the technical solution. A person skilled in the art may implement the described functions with different methods for each of the particular applications, and such implementations shall not be regarded as going beyond the scope of the technical solution according to the embodiments of the present disclosure.

Figure 7:
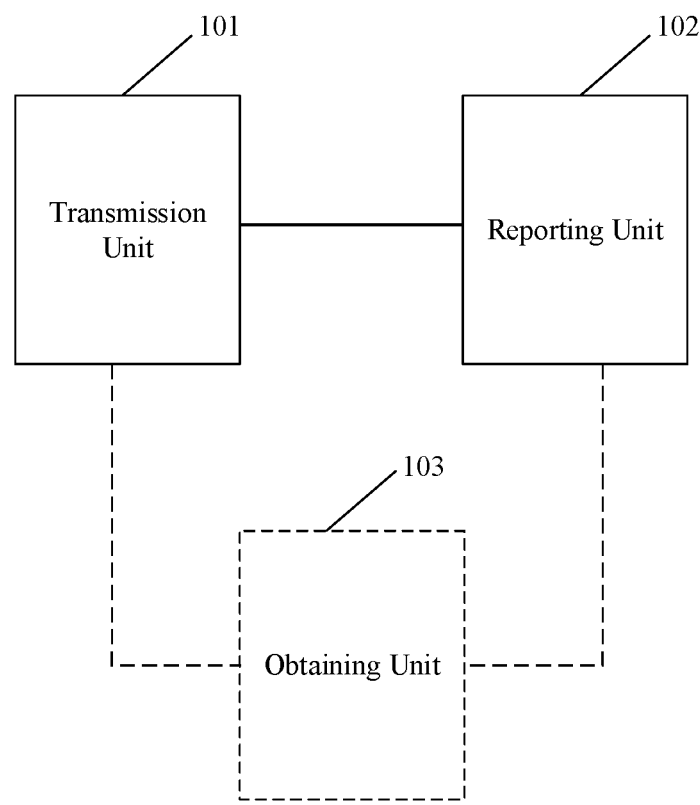
FIG. 7 is a block diagram showing a random access apparatus according to an embodiment.

FIG. 7 is a block diagram of a random access apparatus provided according to an embodiment. The random access apparatus 100 is applied to the terminal, the terminal is in a grant-free scheduling state, the terminal in the grant-free scheduling state is in a non-connected state, and when the terminal has data to be transmitted, it transmits the data on a resource preconfigured by a network device for the terminal at a designated transmission occasion. The apparatus 100 includes a transmission unit 101 and a reporting unit 102.

The transmission unit 101 is configured to transmit a message 3 on a random access resource; and the reporting unit 102 is configured to report a user identity in the message 3, where the user identity is an international mobile subscriber identity (IMSI) or a preconfigured cell radio network temporary identity (C-RNTI).

In an embodiment, the user identity is the IMSI, and the apparatus 100 further includes an obtaining unit 103, configured to: obtain a message 4. The message 4 is included in a physical downlink shared channel (PDSCH) scheduled through a first physical downlink control channel (PDCCH), and the first PDCCH is scrambled by a temporarily allocated C-RNTI.

In another embodiment, the user identity is the preconfigured C-RNTI, and the reporting unit 102 is further configured to: determine whether a target cell to be accessed is an original serving cell; and report a cell identity of the original serving cell if the target cell to be accessed is not the original serving cell.

In yet another embodiment, the reporting unit 102 is further configured to: determine whether the target cell to be accessed is the original serving cell. If the target cell to be accessed is the original serving cell, the user identity includes the preconfigured C-RNTI; and if the target cell to be accessed is not the original serving cell, the user identity includes the IMSI.

In yet another embodiment, the apparatus further includes an obtaining unit 103, configured to obtain a message 4, and the message 4 is included in a PDSCH scheduled through a second PDCCH.

If the target cell to be accessed is the original serving cell, the second PDCCH is scrambled by the preconfigured C-RNTI; and if the target cell to be accessed is not the original serving cell, the second PDCCH is scrambled by the temporarily allocated C-RNTI.

In another embodiment, the reporting unit 102 is further configured to:

report grant-free scheduling state information, where the grant-free scheduling state information indicates that the terminal is in the grant-free scheduling state.

Figure 8:
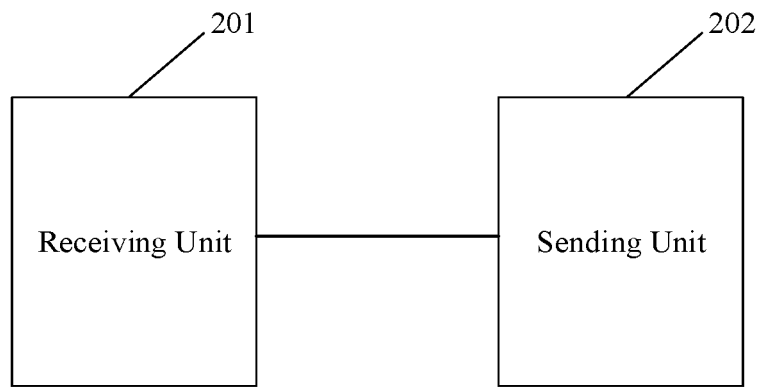
FIG. 8 is a block diagram showing a random access apparatus according to an embodiment.

FIG. 8 is a block diagram of a random access apparatus provided according to an embodiment. The random access apparatus 200 is applied to the network device, and includes a receiving unit 201 and a sending unit 202.

The receiving unit 201 is configured to receive a message 3 on a random access resource, where the message 3 includes a user identity; and the sending unit 202 is configured to send a message 4.

The user identity is an IMSI, the message 4 is contained in a PDSCH scheduled through a first PDCCH, and the first PDCCH is scrambled by a temporarily allocated C-RNTI.

The user identity is a preconfigured C-RNTI, and the message 4 is contained in a PDSCH scheduled through a second PDCCH. If a target cell to be accessed is an original serving cell, the second PDCCH is scrambled by the preconfigured C-RNTI; and if the target cell to be accessed is not the original serving cell, the second PDCCH is scrambled by a temporarily allocated C-RNTI.

In an embodiment, the receiving unit 201 is further configured to: obtain a cell identity of the original serving cell and grant-free scheduling state information, where the grant-free scheduling state information indicates that a terminal is in the grant-free scheduling state in the original serving cell. The sending unit 202 is further configured to send a resource release notification message to the original serving cell identified by the cell identity, and the resource release notification message is used to notify the original serving cell to release a resource reserved for the terminal.

Regarding the apparatus in the above-mentioned embodiments, a specific manner in which each module performs operations has been described in detail in the related method embodiments and will not be described in detail here.

Figure 9:
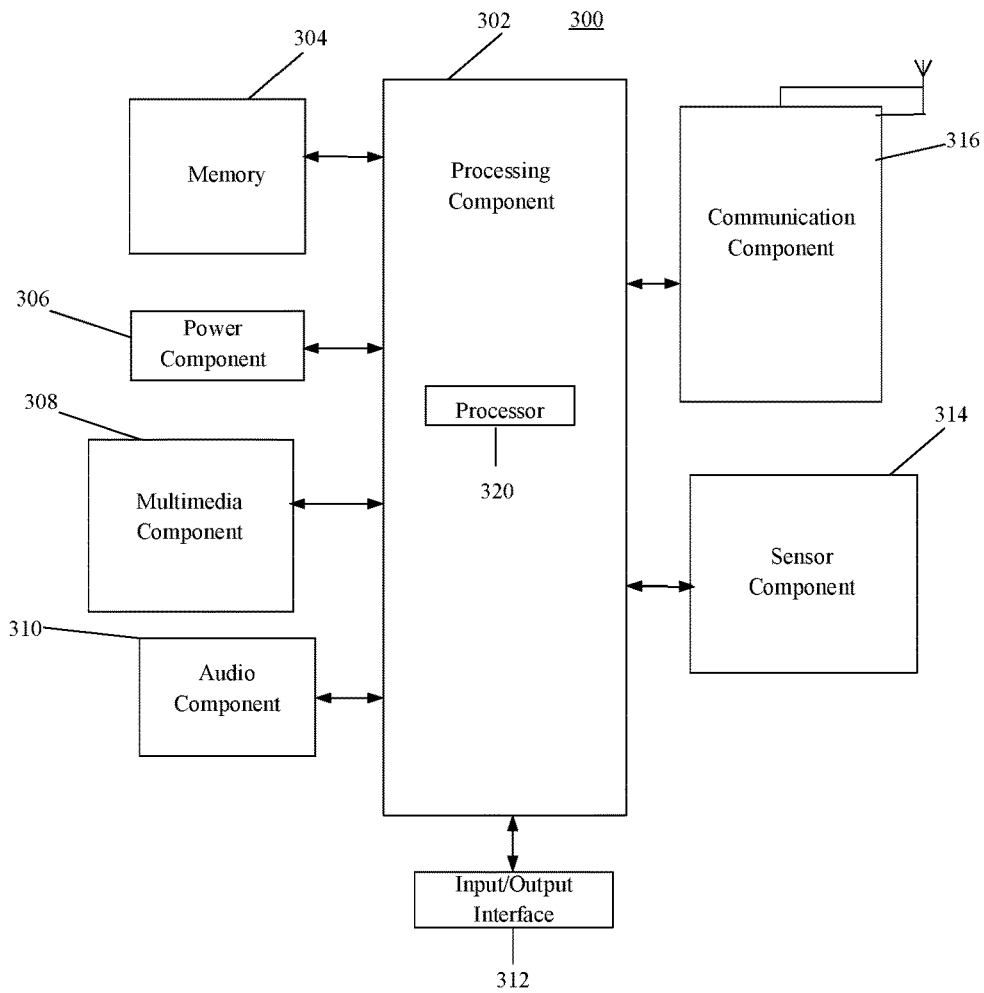
FIG. 9 is a block diagram showing a device according to an embodiment.

FIG. 9 is a block diagram showing a device 300 for random access according to an embodiment. For example, the device 300 may be a mobile phone, a computer, a digital broadcast terminal, a messaging device, a game console, a tablet device, a medical device, a fitness device, a personal digital assistant, or the like.

Referring to FIG. 9, the device 300 may include one or more of the following components: a processing component 302, a memory 304, a power component 306, a multimedia component 308, an audio component 310, an input/output (I/O) interface 312, a sensor component 314, and a communication component 316.

The processing component 302 generally controls overall operations of the device 300, such as the operations associated with display, telephone calls, data communications, camera operations, and recording operations. The processing component 302 can include one or more processors 320 to execute instructions to complete all or part of the steps in the above described methods. Moreover, the processing component 302 can include one or more modules to facilitate the interaction between the processing component 302 and other components. For example, the processing component 302 can include a multimedia module to facilitate the interaction between the multimedia component 308 and the processing component 302.

The memory 304 is configured to store various types of data to support the operations on the device 300. Examples of such data include instructions for any application or method operated on the device 300, contact data, phone book data, messages, pictures, videos, and the so on. The memory 304 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 306 provides power to various components of the device 300. The power component 306 can include a power management system, one or more power sources, and other components associated with the generation, management, and distribution of power in the device 300.

The multimedia component 308 includes a screen providing an output interface between the device 300 and a user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a time period and a pressure associated with the touch or swipe action. In some embodiments, the multimedia component 308 includes a front camera and/or a rear camera. When the device 300 is in an operation mode, such as a photographing mode or a video mode, the front camera and/or the rear camera can receive external multimedia data. Each of the front camera and the rear camera may be a fixed optical lens system or have focus and optical zoom capability.

The audio component 310 is configured to output and/or input an audio signal. For example, the audio component 310 includes a microphone (MIC) configured to receive an external audio signal when the device 300 is in an operation mode, such as a call mode, a recording mode, and a voice recognition mode. The received audio signal may be further stored in the memory 304 or sent via the communication component 316. In some embodiments, the audio component 310 also includes a speaker for outputting the audio signal.

The I/O interface 312 provides an interface between the processing component 302 and peripheral interface modules, such as a keyboard, a click wheel, buttons, or the like.

These buttons may include, but are not limited to, a home button, a volume button, a starting button, and a locking button.

The sensor component 314 includes one or more sensors for providing state assessments of various aspects of the device 300. For example, the sensor component 314 can detect an open/closed state of the device 300, and relative positioning of components, such as the display and the keypad of the device 300. The sensor component 314 can also detect a change in position of the device 300 or one component of the device 300, the presence or absence of the user contact with the device 300, an orientation or an acceleration/deceleration of the device 300, and a change in temperature of the device 300. The sensor component 314 can include a proximity sensor configured to detect the presence of nearby objects without any physical contact. The sensor component 314 can also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as Wi-Fi, 2G or 3G, or a combination thereof. In an embodiment, the communication component 316 receives broadcast signals or broadcast associated information from an external broadcast management system via a broadcast channel. In an embodiment, the communication component 316 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an embodiment, the device 300 may be implemented with one or more application specific integrated circuits (ASICs), digital signal processors (DSPs), digital signal processing devices (DSPDs), programmable logic devices (PLDs), field programmable Gate array (FPGA), controllers, microcontrollers, microprocessors or other electronic components to execute the above methods.

In an embodiment, there is also provided a non-transitory computer-readable storage medium including instructions, such as the memory 304 including instructions executable by the processor 320 of the device 300 to perform the above described methods. For example, the non-transitory computer readable storage medium may be a ROM, a random access memory (RAM), a CD-ROM, a magnetic tape, a floppy disc, an optical data storage device, etc.

Figure 10:
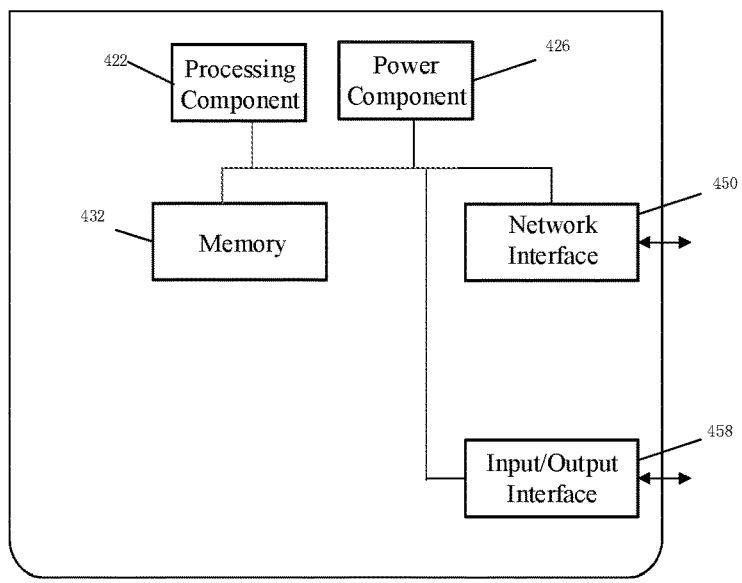
FIG. 10 is a block diagram showing a device according to an embodiment.

FIG. 10 is a block diagram showing a device 400 for random access according to an embodiment. For example, the device 400 may be provided as a network device. Referring to FIG. 10, the device 400 includes a processing component 422, which further includes one or more processors, and memory resources represented by a memory 432 for storing instructions, such as application programs, executable by the processing component 422. The application programs stored in memory 432 may include one or more modules, each of which corresponds to a set of instructions. Moreover, the processing component 422 is configured to execute the instructions to perform the above described methods.

The device 400 may also include a power component 426 configured to perform power management of the device 400, a wired or wireless network interface 450 configured to connect the device 400 to a network, and an input/output (I/O) interface 458. The device 400 may operate based on an operating system stored in the memory 432, such as Windows Server™, Mac OS X™, Unix™, Linux™, FreeBSD™, or the like.

The technical solutions provided by the embodiments of the present disclosure can achieve the following beneficial effects. The terminal in the grant-free scheduling state transmits the message 3 on the random access resource, and reports the user identity in the message 3, where the user identity reported in message 3 is the IMSI or the C-RNTI, making the user identity that needs to be reported when the terminal in the grant-free scheduling state performs the random access clear and definite.

It should be understood that the term "a plurality of" or "multiple" mentioned herein means two or more, and other quantifiers are similar. The term "and/or" describes an association relationship of associated objects, indicating three types of relationships, for example, A and/or B may indicate three situations: A exists alone, A and B exist simultaneously, and B exists alone. The symbol "/" generally indicates an "or" relationship between the contextual objects. The singular forms of "a", "said" and "the" are also intended to include plural forms, unless the context clearly indicates other meanings.

It should be further understood that, although the terms first, second, etc. are used to describe various information, such information should not be limited by these terms. These terms are only used to distinguish the same type of information from each other, and do not imply a particular order or level of importance. In fact, the expressions of "first" and "second" can be used completely interchangeably. For example, without departing from the scope of the present disclosure, the first information may also be referred to as the second information, and similarly, the second information may also be referred to as the first information.

It should be further understood that although operations in the embodiments of the present disclosure are described in a specific order in the drawings, they should not be understood as requiring that the operations be performed in the specific order shown or in a sequential order, or that all the operations shown are performed to get the desired result. In certain environments, multitasking and parallel processing may be advantageous.

Other embodiments of the present disclosure will be apparent to those skilled in the art from consideration of the specification and practice of the present disclosure disclosed herein. The present application is intended to cover any variations, uses, or adaptations of the present disclosure, which follow the general principles of the present disclosure and include common general knowledge or conventional technical means in the art that are not disclosed in the present disclosure. The specification and embodiments shall be considered exemplary only, and the real scope and spirit of the present disclosure are defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A random access method, comprising:

transmitting, by a terminal, a message 3 on a random access resource in a case where the terminal performs random access to re-access a network due to change in link quality, wherein the terminal is in a grant-free scheduling state, the terminal in the grant-free scheduling state is in a non-connected state and receives a cell radio network temporary identity (C-RNTI) preconfigured by a network device, and in response to determining that the terminal has data to be transmitted, the data is transmitted by the terminal on a resource preconfigured by the network device for the terminal at a designated transmission occasion;

reporting, by the terminal, a user identity in the message 3, wherein the user identity comprises an international mobile subscriber identity (IMSI) or the preconfigured C-RNTI;

determining, by the terminal, whether a target cell to be accessed is an original serving cell or not;

in response to determining that the target cell to be accessed is the original serving cell, the user identity comprises the preconfigured C-RNTI;

in response to determining that the target cell to be accessed is not the original serving cell, the user identity comprises the IMSI;

obtaining a message 4, wherein the message 4 is included in a physical downlink shared channel (PDSCH) scheduled by a second physical downlink control channel (PDCCH), wherein in response to determining that the target cell to be accessed is the original serving cell, the second PDCCH is scrambled by the preconfigured C-RNTI, and in response to determining that the target cell to be accessed is not the original serving cell, the second PDCCH is scrambled by a temporarily allocated C-RNTI; and reporting grant-free scheduling state information, wherein the grant-free scheduling state information indicates that the terminal is in the grant-free scheduling state.

2. A random access method, comprising:

receiving, by a network device, a message 3 on a random access resource, wherein the message 3 is transmitted by a terminal in a grant-free scheduling state on a random access resource in a case where the terminal performs random access to re-access a network due to change in link quality, and the message 3 comprises a user identity; and sending, by the network device, a message 4, wherein the user identity is an international mobile subscriber identity (IMSI), the message 4 is included in a physical downlink shared channel (PDSCH) scheduled by a first physical downlink control channel (PDCCH), and the first PDCCH is scrambled by a temporarily allocated C-RNTI;

wherein the user identity is a cell radio network temporary identity (C-RNTI) preconfigured for the terminal in a non-connected state by the network device, and the message 4 is included in a PDSCH scheduled by a second PDCCH;

wherein in response to determining that a target cell to be accessed is an original serving cell, the second PDCCH is scrambled by the preconfigured C-RNTI; and wherein in response to determining that the target cell to be accessed is not the original serving cell, the second PDCCH is scrambled by the temporarily allocated C-RNTI, wherein the method further comprises:

obtaining a cell identity of the original serving cell and grant-free scheduling state information, wherein the grant-free scheduling state information indicates that the terminal is in the grant-free scheduling state in the original serving cell; and sending a resource release notification message to the original serving cell identified by the cell identity, wherein the resource release notification message notifies the original serving cell to release a resource reserved for the terminal.

3. A random access apparatus applied to a terminal, comprising:

a processor; and a memory for storing instructions executable by the processor, wherein the processor is configured to execute the instructions to perform acts comprising:

transmitting a message 3 on a random access resource in a case where the terminal performs random access to re-access a network due to change in link quality, wherein the terminal is in a grant-free scheduling state, the terminal in the grant-free scheduling state is in a non-connected state and receives a cell radio network temporary identity (C-RNTI) preconfigured by a network device, and in response to determining that the terminal has data to be transmitted, the data is transmitted by the terminal on a resource preconfigured by the network device for the terminal at a designated transmission occasion;

reporting a user identity in the message 3, wherein the user identity comprises an international mobile subscriber identity (IMSI) or the preconfigured C-RNTI;

determining whether a target cell to be accessed is an original serving cell or not;

in response to determining that the target cell to be accessed is the original serving cell, the user identity comprises the preconfigured C-RNTI;

in response to determining that the target cell to be accessed is not the original serving cell, the user identity comprises the IMSI;

obtaining a message 4, wherein the message 4 is included in a physical downlink shared channel (PDSCH) scheduled by a second physical downlink control channel (PDCCH), wherein in response to determining that the target cell to be accessed is the original serving cell, the second PDCCH is scrambled by the preconfigured C-RNTI, and in response to determining that the target cell to be accessed is not the original serving cell, the second PDCCH is scrambled by a temporarily allocated C-RNTI; and reporting grant-free scheduling state information, wherein the grant-free scheduling state information indicates that the terminal is in the grant-free scheduling state.

4. A non-transitory computer-readable storage medium, wherein instructions in the storage medium, when being executed by a processor of a mobile terminal, cause the mobile terminal to perform the random access method according to claim 1.

5. A random access apparatus, comprising:

a processor; and a memory for storing instructions executable by the processor;

wherein, the processor is configured to perform the random access method according to claim 2.

6. A non-transitory computer-readable storage medium, wherein instructions in the storage medium, when being executed by a processor of a mobile terminal, cause the mobile terminal to perform the random access method according to claim 2.

\* \* \* \* \*